(12) United States Patent
Watson et al.

(10) Patent No.: US 9,447,908 B2
(45) Date of Patent: Sep. 20, 2016

(54) ANTI-SIPHON ASSEMBLY

(71) Applicants: Kenneth Watson, Vancouver, WA (US); Bob Klein, Gresham, OR (US); John Loffink, Damascus, OR (US)

(72) Inventors: Kenneth Watson, Vancouver, WA (US); Bob Klein, Gresham, OR (US); John Loffink, Damascus, OR (US)

( * ) Notice: Subject to any disclaimer, the term of this patent is extended or adjusted under 35 U.S.C. 154(b) by 386 days.

(21) Appl. No.: 13/954,109

(22) Filed: Jul. 30, 2013

(65) Prior Publication Data

US 2014/0034176 A1 Feb. 6, 2014

Related U.S. Application Data

(60) Provisional application No. 61/717,776, filed on Oct. 24, 2012, provisional application No. 61/677,910, filed on Jul. 31, 2012.

(51) Int. Cl.
| | |
|---|---|
| *F16L 55/00* | (2006.01) |
| *B60K 15/04* | (2006.01) |
| *B60K 15/03* | (2006.01) |

(52) U.S. Cl.
CPC ............ *F16L 55/00* (2013.01); *B60K 15/0403* (2013.01); *B60K 2015/03434* (2013.01)

(58) Field of Classification Search
CPC .......................................... B60K 2015/03434
USPC ................................................ 220/86.1–86.3
See application file for complete search history.

(56) References Cited

U.S. PATENT DOCUMENTS

| | | | | |
|---|---|---|---|---|
| 4,295,577 A | * | 10/1981 | Schmid .............. | B60K 15/0403 220/86.1 |
| 4,345,694 A | * | 8/1982 | Chambers .......... | B60K 15/0403 141/392 |
| 4,630,748 A | * | 12/1986 | Keller ................ | B60K 15/0403 220/86.3 |
| 7,665,492 B2 | * | 2/2010 | Burstein ................. | B67C 11/02 141/332 |
| 7,721,902 B2 | * | 5/2010 | Grote ................. | B60K 15/0403 220/86.3 |
| 2005/0051236 A1 | * | 3/2005 | Watson .............. | B60K 15/0403 141/370 |
| 2007/0228041 A1 | * | 10/2007 | Wholey ............. | B60K 15/0403 220/86.3 |
| 2008/0156800 A1 | * | 7/2008 | Mougenot .......... | B60K 15/0403 220/86.3 |
| 2010/0224260 A1 | * | 9/2010 | Avakian ............. | B60K 15/0403 137/13 |
| 2012/0125927 A1 | * | 5/2012 | Watson .............. | B60K 15/0403 220/86.3 |

* cited by examiner

*Primary Examiner* — Paul R Durand
*Assistant Examiner* — Vishal Pancholi
(74) *Attorney, Agent, or Firm* — Ingrid McTaggart

(57) ABSTRACT

An anti-siphon assembly includes a siphon tube having a first end region adapted for securement to the inner surface of a fuel filler neck and a second end region adapted to be positioned in a fuel tank for allowing fuel to flow there through into said tank. The assembly includes a locking ring which secures, in an off axis manner, the first end region of the siphon tube within the fuel filler neck with the use of specialized installation tool.

19 Claims, 6 Drawing Sheets

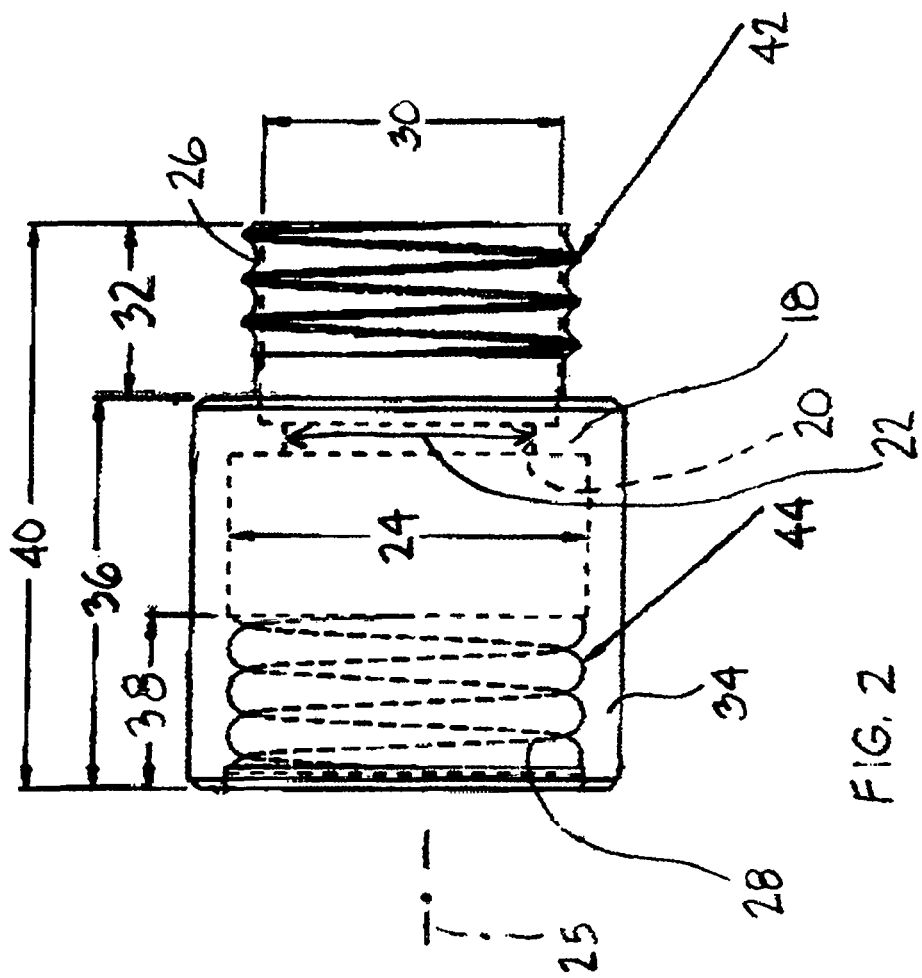
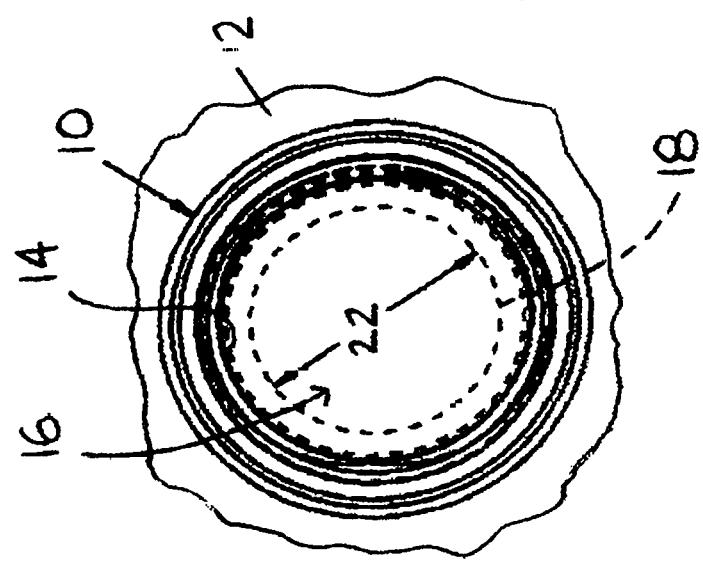
FIG. 2
FIG. 1

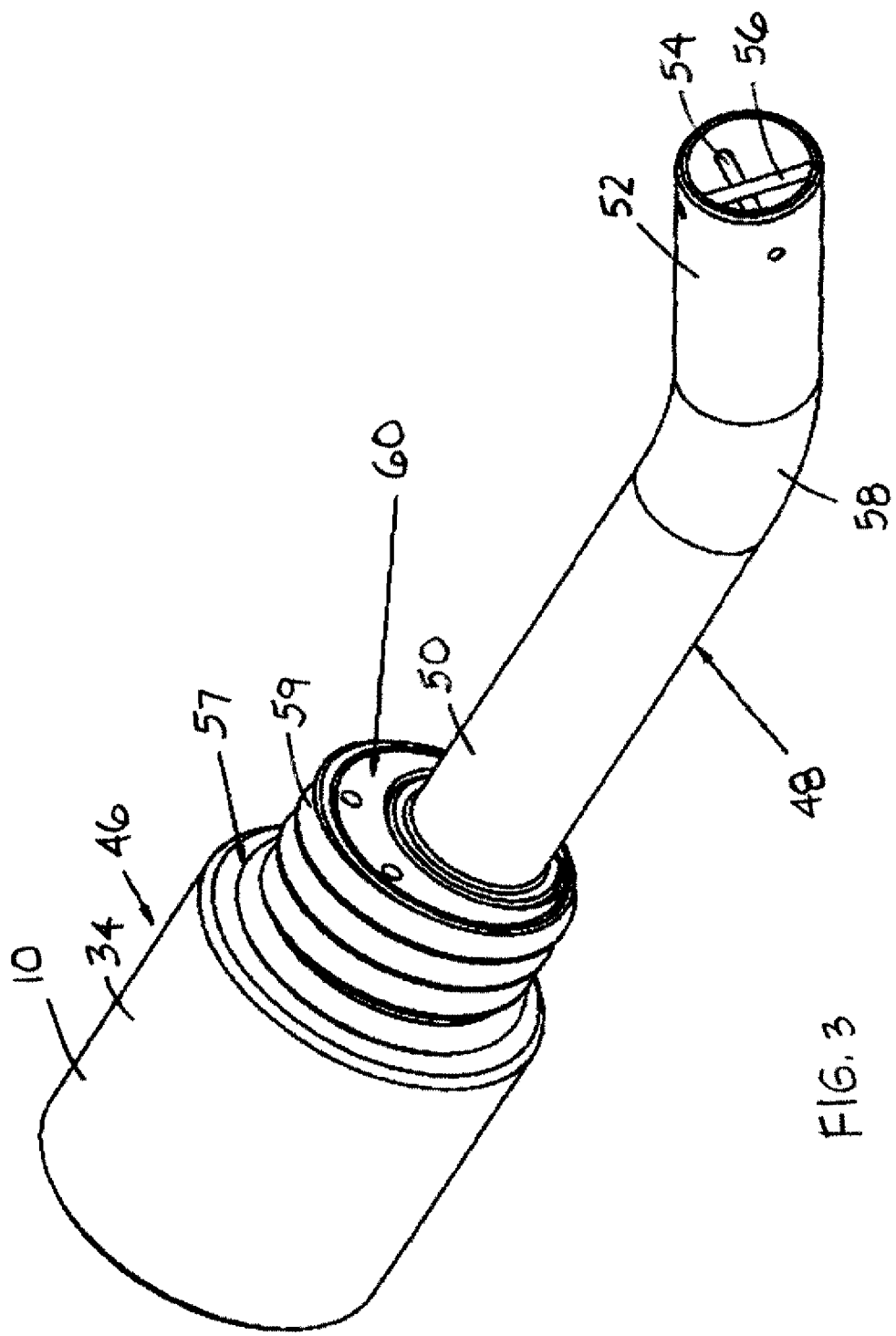

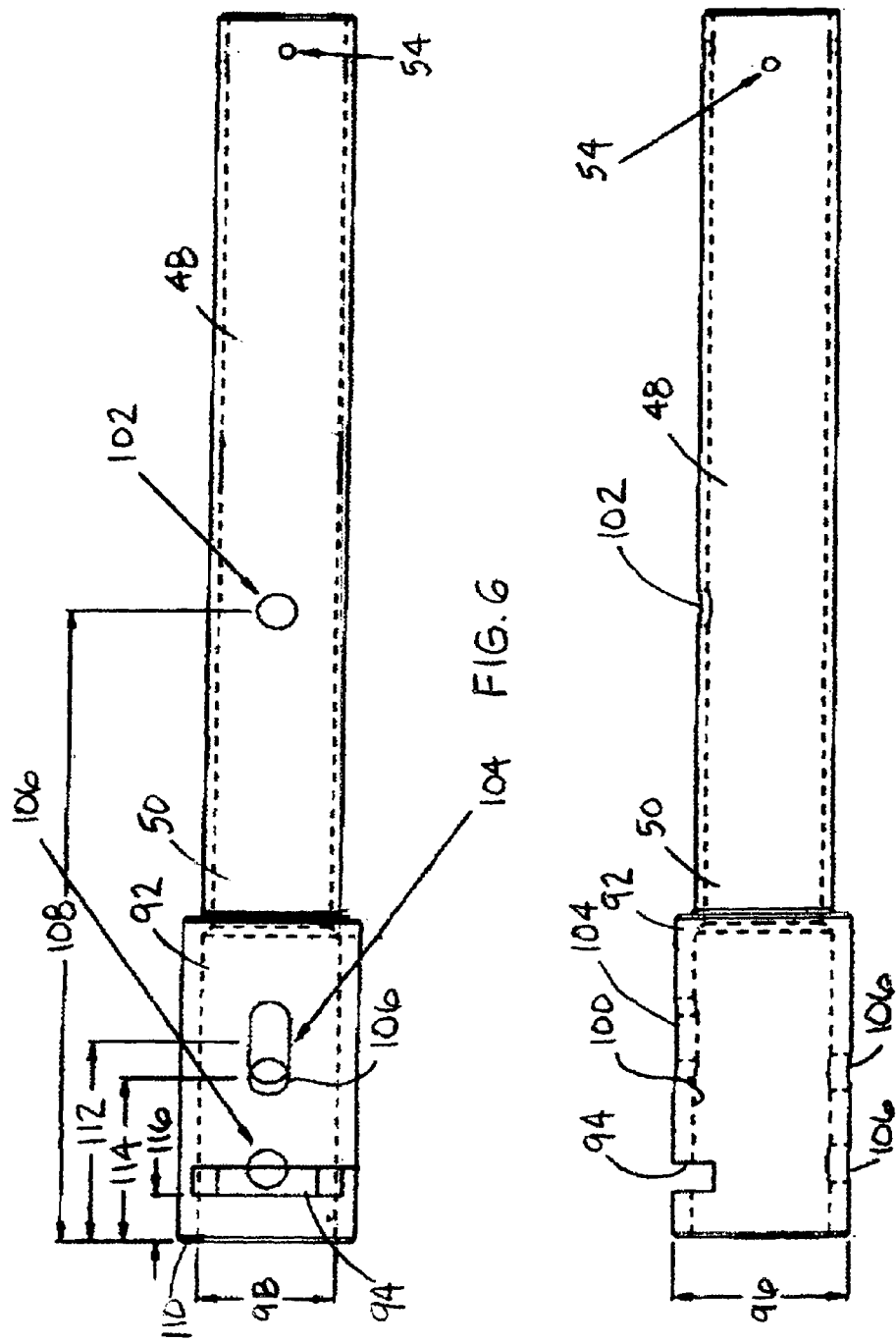

ANTI-SIPHON ASSEMBLY

This application claims priority on U.S. provisional patent application Ser. No. 61/717,776, filed on Oct. 24, 2012, and claims priority on U.S. provisional patent application Ser. No. 61/677,910, filed on Jul. 31, 2012.

BACKGROUND OF THE INVENTION

The present invention is particularly intended for use on fuel tanks on gasoline vehicles, although it may be used on any fuel tank connected to any type of engine.

Fuel tanks typically include a filler tube inlet or opening through which fuel is filled into the fuel tank. On large vehicles, such as rental trucks, the fuel tanks may be quite large. Due to high cost of fuel, these large fuel tanks may be susceptible to illegal siphoning of the fuel from the fuel tank.

Siphoning of fuel from a fuel tank generally involves placing a hose through the filler tube inlet or opening and down into the fuel held within the fuel tank. A suction pressure is then applied to the opposite end of the hose such that fuel within the tank flows upwardly and out of the tank through the hose. Siphoning generally cannot be accomplished if the hose cannot be placed downwardly into the tank and into the fuel held within the tank.

In order to prevent siphoning of fuel from fuel tanks, anti-siphon devices have been developed. One such anti-siphon device is described in U.S. Pat. No. 4,630,748, entitled Anti-Siphon Fuel Filler Assembly, wherein a tube is inserted into the tank inlet opening. A lower end of the tube is completely compressed together across the tube's diameter and then welded to form a lower restriction in the tube. Holes are cut or stamped in the lower region of the tube thereby allowing fuel to pass therethrough during filling of the fuel tank. The welded end of the tube generally prevents a hose from being placed downwardly into the fuel tank.

The compressing and welding required for such prior art anti-siphon devices is labor intensive and requires certain manufacturing tools such as heavy duty compressing and welding machines. Accordingly, the prior art manufacturing process results in a device having a relatively large manufacturing cost.

Moreover, anti-siphon devices may be desired for use on vehicles already in use. In such cases, an anti-siphon device that may be securely installed on an existing fuel filler neck may be desirable.

There is a need, therefore, for an anti-siphon fuel filler assembly that can be manufactured without expensive compressing and welding equipment, and which can be manufactured with reduced labor intensive manufacturing steps.

SUMMARY OF THE INVENTION

One embodiment of an anti-siphon assembly includes a siphon tube having a first end region adapted for securement to the inner surface of a fuel filler neck and a second end region adapted to be positioned in a fuel tank for allowing fuel to flow there through into said tank but inhibiting a siphon tube from being inserted into the fuel tank. The assembly includes a locking ring which secures the first end region of the siphon tube, in an off axis manner, within the fuel filler neck with the use of specialized installation tool.

BRIEF DESCRIPTION OF THE DRAWINGS

FIG. 1 is a top view of one embodiment of a fuel filler neck of a fuel tank without an anti-siphon assembly installed.

FIG. 2 is a side view of the fuel filler neck of FIG. 1.

FIG. 3 is an isometric view of one embodiment of an anti-siphon assembly installed in the fuel filler neck of FIG. 1.

FIG. 6 is a top view of a tube of one example embodiment of an anti-siphon assembly in an unbent condition.

FIG. 7 is a side view of the tube of FIG. 6.

DETAILED DESCRIPTION OF THE PREFERRED EMBODIMENTS

Figure 5:
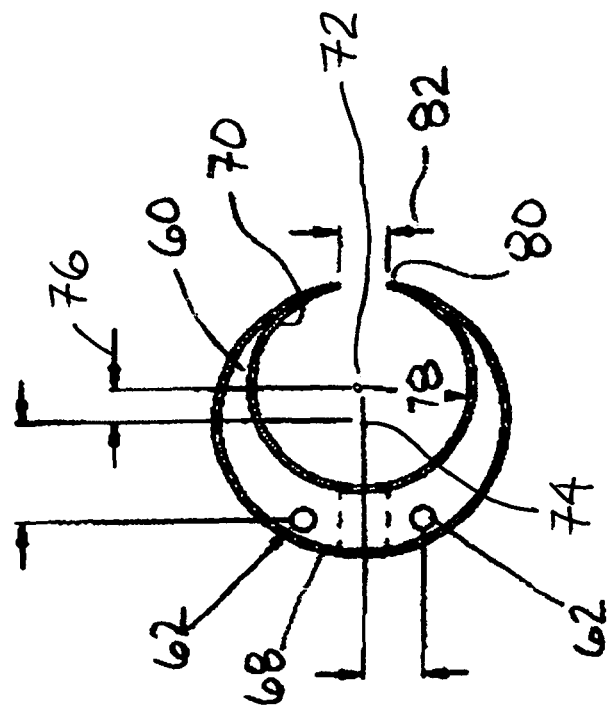
FIG. 5 is a top view of the locking ring of FIG. 4.

FIG. 1 is a top view of one embodiment of a fuel filler neck 10 of a fuel tank 12 without an anti-siphon assembly installed. The fuel tank may be a gasoline fuel tank or may be adapted to contain any type of liquid fuel therein. Fuel filler neck 10 may include an opening 14 that may define an interior surface 16. Interior surface 16 of fuel filler neck 10 may include a nozzle support 18 that defines an inwardly extending projection that extends completely around interior surface 16. Accordingly, nozzle support 18 may be defined as an inwardly extending tab that defines a curved, radially extending surface 20 for supporting a fuel nozzle of a fuel pump thereon. Nozzle support 18 may be manufactured integral with a remainder of fuel filler neck 10 or may be added to a fuel filler neck 10 after manufacturing thereof. During normal filling operations of fuel tank 12, the operator will place the nozzle of a fuel pump into opening 14 of fuel filler neck 10 by placing the nozzle through opening 14 of fuel filler neck 10 and then resting a groove or other attachment means of the nozzle on nozzle support 18.

During siphoning of fuel from fuel tank 12, a flexible siphon hose generally is inserted into an opening of a fuel tank and is allowed to fall by the force of gravity and the flexible nature of the siphon hose downwardly into fuel held within a lower region of the fuel tank. Once the end of the siphon hose is positioned downwardly within fuel held within the fuel tank a suction pressure may be applied to the external end of the siphon hose, resulting in siphoning of fuel from the fuel tank. The anti-siphon device of the present invention inhibits placement of a siphoning hose downwardly into fuel with the fuel tank such that siphon pressure applied to the external end of the siphon hose will not result in siphoning of fuel from the fuel tank.

FIG. 2 is a side view of the fuel filler neck of FIG. 1. In this view, nozzle support 18 is shown having an inner diameter 22 less than an inner diameter 24 of opening 14 of the fuel filler neck 10, and an elongate axis 25. In one embodiment, diameter 22 is 1.3 inches (in) and diameter 24 is 1.85 in. In this embodiment, fuel filler neck 10 defines an extension of an existing tank's fuel filler neck such that extension fuel filler neck 10 defines first threads 26 for securing to a fuel tank, and second threads 28 for securement of a fuel cap thereto. In one embodiment, first threads 26 define an outer diameter 30 of 1.555 in and a length 32 of 1.0 in. Second threads are positioned on an extension region 34 that defines a length 36 of 2.25 in and second threads themselves defines a length 38 of 1.0 in. Fuel filler neck extension 10 may define a length 40 of 3.25 in. First threads 26 and second threads 28 may each define a thread pattern 42 and 44, respectively, of SAE J114.

FIG. 3 is an isometric view of one embodiment of an anti-siphon assembly 46 installed in the fuel filler neck 10 of FIG. 1. In this embodiment an anti-siphon assembly 46 may include a siphon tube 48 installed within fuel filler neck 10. Siphon tube 48 may include a first end region 50 positioned in opening 14 and a second end region 52 that extends inwardly into fuel tank 12. Second end region 52 of siphon tube 48 may include cross pins 54 and 56 that prevent a siphoning hose from being inserted completely through the siphon tube 48 and thereby prohibit siphoning of fuel from fuel tank 12. Moreover, siphon tube 48 may include a bend region 58 positioned between first and second end regions 50 and 52 of siphon tube 48. Bend region 58 may inhibit a straight rigid object, such as a crowbar, from being inserted into siphon tube 48 in order to dislodge or otherwise damage pins 54 and 56. Bend 58 may also prohibit a clear view of second end region 52 and pins 54 and 56, such that a potential vandal cannot view pins 54 and 56, and therefore cannot easily determine what device or devices may block or inhibit a siphon hose from being fully inserted through siphon tube 48. Siphon tube 48 may be held within fuel filler neck 10 by a lock ring 60 which prevents the removal of siphon tube 48 from fuel filler neck 10 without use of a specialized installation tool (FIG. 9), as will be described below in more detail. Fuel filler neck 48 may include an O-ring 57 positioned between extension region 34 and a lower region 59 of fuel filler neck 10.

Figure 4:
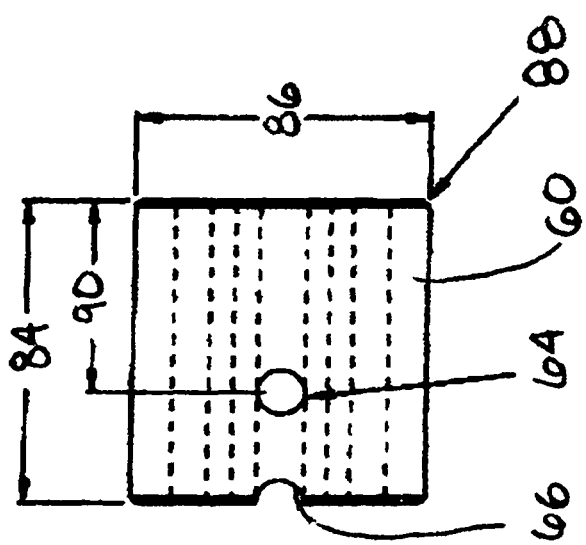
FIG. 4 is a side view of a locking ring of one example embodiment of an anti-siphon assembly.

FIGS. 4 and 5 are a side and a top view, respectively, of a locking ring of one example embodiment of an anti-siphon assembly. Lock ring 60 may include two vent apertures 62 that allow venting of fuel tank 12 through the lock ring while the lock ring is installed within fuel filler neck 10 (FIG. 1). Lock ring 60 may also include two tool apertures 64 and 66 that allow insertion of two mating prongs of an installation tool (FIG. 9) which will retain the locking ring in a stationary, non-rotating position as fuel filler neck 10 (FIG. 1) is rotated around the locking ring. In this embodiment, tool aperture 66 is a partial aperture, or a groove, which allows seating of a tool prong therein. Lock ring 60 generally defines a circular outer surface 68 and a circular inner surface or aperture 70 that is offset, i.e., not axially aligned, with circular outer surface 68. In the embodiment shown, inner circular surface 70 defines an elongate axis 72 that is offset from an elongate axis 74 of outer surface 68 by a distance 76 of approximately 0.188 inches. Inner circular surface 70 may define a radius 78 of 0.565 in which may be sized to accommodate an outer diameter of siphon tube 48 (FIG. 3). Lock ring 60 may further include an aperture of a cut out region 80 which may be aligned with a vent aperture in siphon tube 48, as will be described in more detail below. In the embodiment shown, cut out region 80 may define a width 82 of 0.25 in. In the embodiment shown, lock ring 48 may define a length 84 of 1.725 in, a width 86 of 1.55 in and chamfered end regions 88 which may ease insertion of lock ring 60 into fuel filler neck 48 (FIG. 3). Tool aperture 64 may be positioned a distance 90 of 1.10 in from an end of lock ring 60.

FIGS. 6 and 7 are a top view and a side view, respectively, of a tube 48 of one example embodiment of an anti-siphon assembly in an unbent condition. First end region 50 of siphon tube 36 may include an enlarged diameter region 92 sized to be positioned within the inner circular surface 70 of locking ring 48 (FIG. 5). Enlarged diameter region 92 may include a cutout region, such as an aperture 94, adapted to receive therein inner surface 20 of nozzle support 18 (FIG. 2). When siphon tube 48 is held in place within a lower region 59 (FIG. 3) of fuel filler neck 10 then aperture 94 will be secured around inwardly extending surface 20 of nozzle support 18 which in turn will secure siphon tube 48 securely in place within fuel filler neck 10. Enlarged diameter region 92 of siphon tube 48 may define an outer diameter 96 of 1.123 in, which may be sized to slide snugly through inner surface 20 of fuel filler neck 10, and at the same time may define an inner diameter 98 that allows a fuel nozzle of a fuel pump to be placed therein. Enlarged diameter region 92 of siphon tube 48 may be manufactured in a size or thickness that allows inwardly extending surface 20 of nozzle support 18 to be received upwardly within aperture 94 but not inwardly into an interior 100 of siphon tube 48 which might impede the placement of a fuel nozzle of a fuel pump therein.

Enlarged diameter region 92 of siphon tube 48 may further include a fuel aperture 102 which may be placed within siphon tube 48 so as to allow fuel to fill an interior of siphon tube 48 once fuel tank 12 reaches or comes close to a predetermined fuel fill level within fuel tank 12, such as 85% or 90% fuel fill. Enlarged diameter region 92 of siphon tube 48 may further include a vent aperture 104 which may be positioned within siphon tube 48 so as to be aligned with a fuel nozzle aperture during filling of fuel within fuel tank 12 from a fuel nozzle. Accordingly, the automatic shutoff features of a fuel nozzle may be properly activated by venting of gases from fuel tank 12 through aperture 104 and thereafter through a vent within the fuel nozzle. Enlarged diameter region 92 may further include two tool apertures 106 positioned to receive prongs of an installation tool (FIG. 9) during installation or removal of siphon tube 48 from fuel filler neck 10. Fuel aperture 102 may be spaced a distance 108 from a first edge region 110 of 4.375 in, and a center of vent aperture 104 may be spaced a distance 112 from first edge region 110 of 1.375 in. A tool aperture 106 may be spaced a distance 114 from first edge region 110 of 1.133 in and a top edge of aperture 94 may be spaced a distance 116 from first edge region 110 of 0.32 in.

Figure 8:
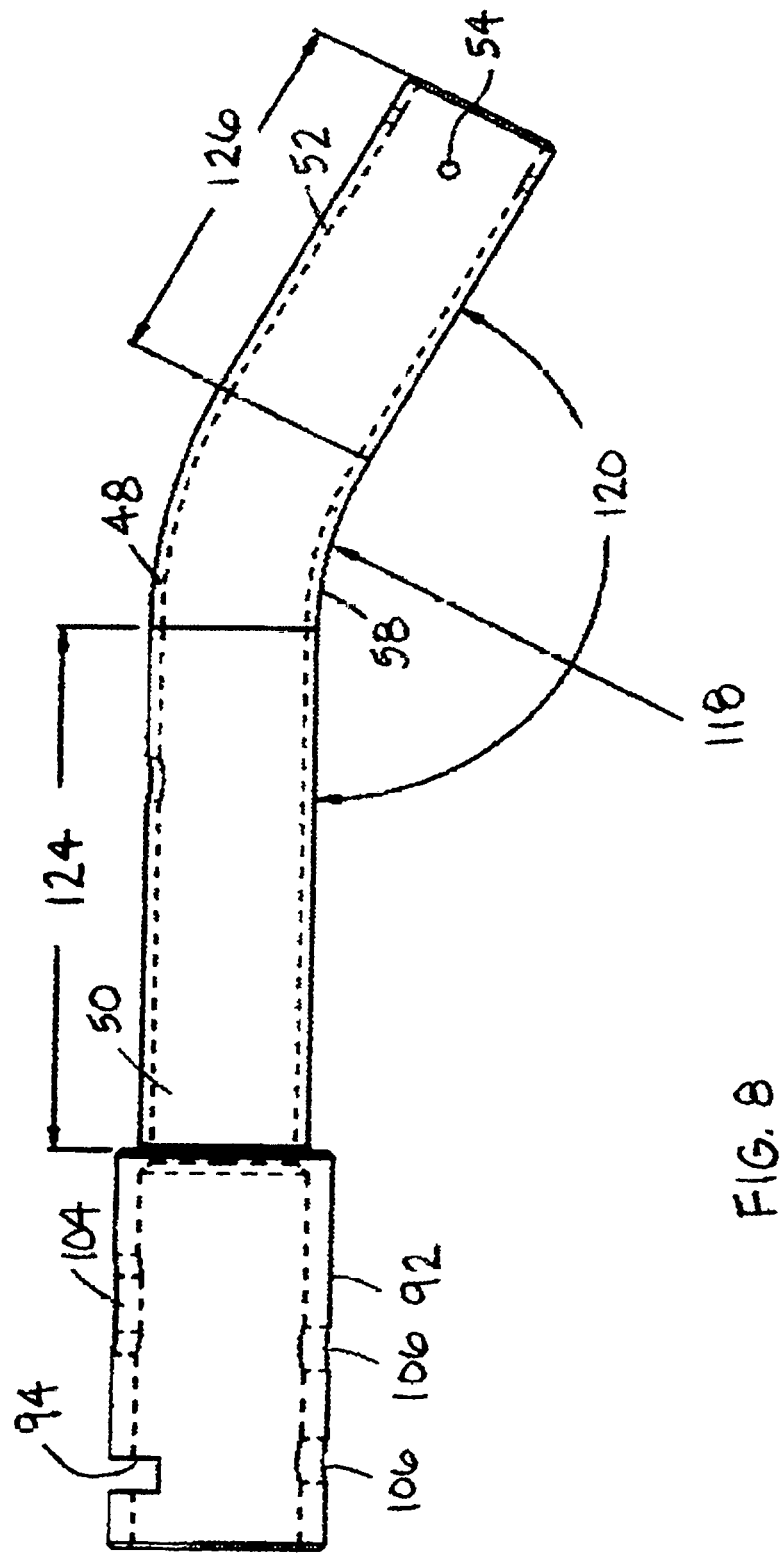
FIG. 8 is a side view of a tube of one example embodiment of an anti-siphon assembly in a bent, installation ready condition.

FIG. 8 is a side view of a siphon tube 48 of one example embodiment of an anti-siphon assembly 46 in a bent, installation ready condition. In this embodiment, bend region 58 may define a radius 118 of 1.57 in which may define an angle 120 of 152 degrees. This angle 120 preferably will be positioned at an angle 122 of 180 degrees opposite of slot or aperture 104 so as to allow proper installation of and placement of anti-siphon assembly within a fuel tank 12. In this embodiment, a straight section of siphon tube 48 in first end region 50 may define a length 124 of 3.0 in, and a straight section of siphon tube 48 in second end region 52 may define a length 126 of 2.0 in.

Figures 9, 10:
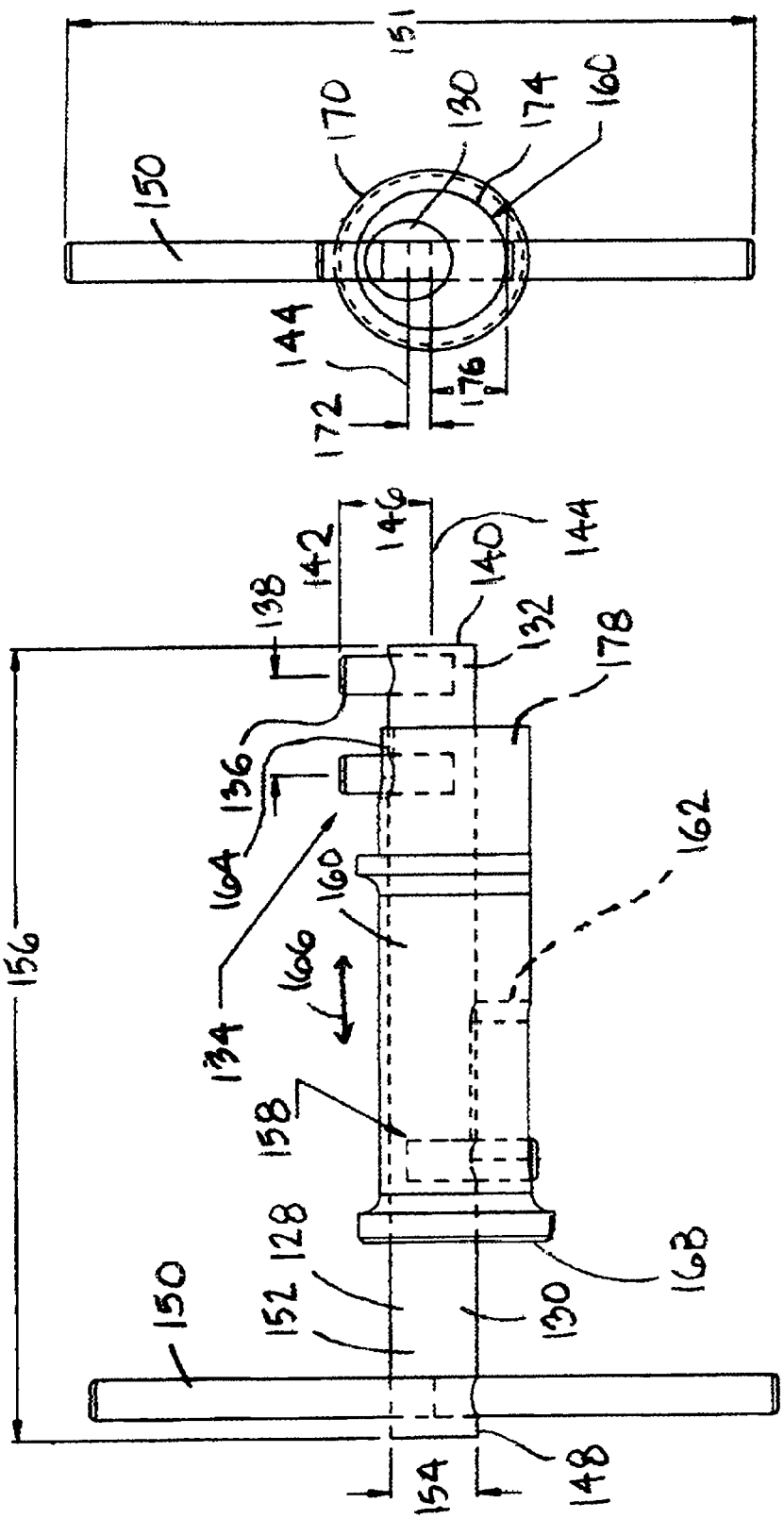
FIG. 9 is a side view of one example embodiment of an installation tool of an anti-siphon assembly.
FIG. 10 is an end view of the installation tool of FIG. 9.

FIGS. 9 and 10 are a side view and an end view, respectively, of one example embodiment of an installation and removal tool 128 of an anti-siphon assembly 46. Installation tool 128 may include an elongate shaft 130 having a first end region 132 that includes first and second prongs 134 and 136 that each extend outwardly there from. In the embodiment shown the prongs may be spaced apart a distance 138 of 0.625 in and prong 136 may be spaced from an end 140 of shaft 130 a distance 142 of 0.185 in. The prongs 134 and 136 may extend upwardly from a central axis 144 of shaft 130 a distance 146 of 0.53 in. A second end 148 of shaft 130 may include a handle 150 that allows easy turning of shaft 130 about central axis 144. Handle 150 may define a length 151 of 4.0 in. Shaft 130 may define a cylindrical outer surface 152 that defines a diameter 154 of 0.5 in, and a length 156 of 5.0 in. Shaft 130 may further include a pin 158 extending outwardly from shaft 130 in a direction opposite from prongs 134 and 136.

Tool 128 may further include an outer sheath 160 slidably positioned on shaft 130 and including an elongate slot 162 that receive pin 158 therein. Sheath 160 may further include a second elongate slot 164 that receives prong 134 therein. Pin 158 positioned in slot 162 allows axial sliding movement of sheath 160 along shaft 130 in direction 166 such that a first end 168 of sheath 160 may be moved between its position as shown in FIG. 9 and a second position wherein first end 168 is positioned adjacent handle 150 and a second end region 178 of sheath 160 is moved toward handle 150 and away from pin 134.

Referring in particular to FIG. 10, sheath 160 may define an outer circular surface 170 that may be offset from shaft axis 144 a distance 172 of 0.13 in. A reduced diameter portion 174 may define a radius 176 of 0.438 in.

With reference to FIGS. 1-10, installation of anti siphon assembly 46 will now be described. Siphon tube 48 is posited within fuel filler neck 10 such that first end region 50 of the siphon tube 48 is positioned within lower region 59 of fuel filler neck 10 and second end region 52 of siphon tube 48 is positioned extending from first threads 26 of fuel filler neck 48 and opposite from second threads 28 of the fuel filler neck 10. Aperture 94 on enlarged diameter region 92 of siphon tube 48 is positioned such that aperture 94 is secured on inner surface 20 of nozzle support 18. Lock ring 60 is placed within fuel filler neck 10 such that enlarged diameter region 92 of siphon tube 48 is positioned within inner circular surface 70 of lock ring 60. The lock ring is further positioned such that tool apertures 64 and 66 on lock ring 60 are aligned with tool apertures 106 on siphon tube 48 and such that cut out region 80 of lock ring 60 is aligned with vent aperture 104 on siphon tube 48. Sheath 160 is then moved along shaft 130 such that first end 168 is positioned adjacent handle 150. Using handle 50 of the installation tool 128, first end 132 of installation tool 128 is inserted into fuel filler neck 10 through extension region 34 and prongs 134 and 136 are then placed into aligned tool apertures 64 and 66 on lock ring 60 and tool apertures 106 on siphon tube 48. Sheath 160 is then moved axially along shaft 130 such that first end 168 is positioned distal from handle 150 of installation tool 128 and such that second end region 178 of sheath 160 is positioned inside inner circular surface 70 of lock ring 60 and surrounding enlarged outer diameter region 92 of siphon tube 48. In this position, due to the presence of prongs 134 and 136, and pin 158 on shaft 130, sheath 160 will not rotate about axis 144 of shaft 130. Moreover, due to prongs 134 and 136 of shaft 130 being positioned within tool apertures 64, 66 and 106, lock ring 60 and siphon tube 48 will not rotate about axis 144 of shaft 130 when handle 150 of installation tool 128 is held stationary. In this stationary position, i.e., an operator holds installation tool 128 stationary, fuel filler neck 10 is rotated about axis 144 of shaft 130 of installation tool 128. Due to the stationary positioning of siphon tube 48 and lock ring 60, and due to the off axis positioning of inner circular surface 70, which retains enlarged diameter region 92 of siphon tube 48 in an off axis position within respect to a central axis 25 of fuel filler neck 10, rotation of fuel filler neck 48 causes aperture 94 on siphon tube 48 to be securely, frictionally engaged with inner surface 20 of nozzle support 18.

Once siphon tube 48 and lock ring 60 are securely positioned within fuel filler neck 10, installation tool 128 is removed from engagement with lock ring 60 and siphon tube 48, and moved outwardly of fuel filler neck 10. In this position the anti siphon assembly 46 is securely installed within fuel filler neck 10 and cannot be removed without use of installation tool 128. In particular, if a vandal tries to rotate lock ring 60 and/or siphon tube 48 within fuel filler neck 48, the off axis position of siphon tube 48 within lock ring 60, with respect to central axis 25 of fuel filler neck 10, will merely result in aperture 94 of siphon tube 48 being pressed into firmer engagement with inner surface 20 of nozzle support 18. To remove the anti siphon assembly 46 from fuel filler neck 10, the installation tool 128 is inserted into fuel filler neck 10 and the installation process is conducted in reverse order.

The components of the system as described may be manufactured of a rigid and sturdy material such as steel, aluminum, rigid plastic, or the like.

In the above description numerous details have been set forth in order to provide a more through understanding of the present invention. It will be obvious, however, to one skilled in the art that the present invention may be practiced using other equivalent designs.

We claim:

1. An anti-siphon apparatus, comprising:
    an anti-siphon tube that defines a cylindrical exterior surface;
    a lock ring including a cylindrical exterior surface that defines an outside diameter and a central elongate axis, and an inner cylindrical surface axially offset from said central elongate axis of said exterior surface, said inner cylindrical surface sized to receive therein said exterior surface of said anti-siphon tube; and
    an installation tool including a locking structure that engages said lock ring and said anti-siphon tube when said tube is positioned in said lock ring, and said installation tool further including an inner shaft that includes said locking structure fixedly secured thereon, and an outer sheath movable along said inner shaft.

2. The apparatus of claim 1 wherein said anti-siphon tube includes a tool aperture and wherein said locking structure is a pin that is received within said tool aperture.

3. The apparatus of claim 2 wherein said lock ring includes a tool aperture and wherein said pin of said installation tool simultaneously is received within said tool aperture of said anti-siphon tube and said tool aperture of said lock ring.

4. The apparatus of claim 1 wherein said anti-siphon tube includes first and second tool apertures, said lock ring includes first and second tool apertures, said locking structure includes a first pin received simultaneously within said first tool apertures of said anti-siphon tube and said lock ring, and wherein said locking structure includes a second pin received simultaneously within said second tool apertures of said anti-siphon tube and said lock ring.

5. The apparatus of claim 1 wherein said outer sheath is movable along said inner shaft between an installation position directly adjacent said locking structure and a removal position distal from said locking structure.

6. An anti-siphon apparatus, comprising:
    an anti-siphon tube that defines a cylindrical exterior surface;
    a lock ring including a cylindrical exterior surface that defines an outside diameter and a central elongate axis, and an inner cylindrical surface axially offset from said central elongate axis of said exterior surface, said inner cylindrical surface sized to receive therein said exterior surface of said anti-siphon tube;
    an installation tool including a locking structure that engages said lock ring and said anti-siphon tube when said tube is positioned in said lock ring; and a fuel filler neck that defines a cylindrical inner surface having an inwardly extending projection positioned there around, said anti-siphon tube including a projection receiving aperture that receives a portion of said projection therein.

7. The apparatus of claim 6 wherein said lock ring includes a cut out region, and wherein said portion of said projection extends through said cut out region and into said projection receiving aperture of said anti-siphon tube.

8. The apparatus of claim 6 wherein said fuel filler neck includes an exterior surface secured to a fuel tank.

9. The apparatus of claim 1 wherein said anti-siphon tube includes a first end region secured within said lock ring, a second end region positioned distal from said first end region and including anti-siphon structure positioned therein, and a central region positioned there between, said central region of said anti-siphon tube including a bend therein.

10. A method of installing an anti-siphon device in a fuel tank, comprising:
   placing an anti-siphon tube within a fuel filler neck of a fuel tank, said anti-siphon tube including a cylindrical exterior surface;
   placing a lock ring around said anti-siphon tube and within said fuel filler neck, wherein said a lock ring includes a cylindrical exterior surface that defines an outside diameter and a central elongate axis, and an inner cylindrical surface axially offset from said central elongate axis of said exterior surface, said inner cylindrical surface sized to receive therein said cylindrical exterior surface of said anti-siphon tube;
   placing an installation tool within said fuel filler neck and into engagement with said anti-siphon tube and said lock ring, said installation tool including an inner shaft that includes a locking structure fixedly secured thereon and an outer sheath movable along said inner shaft, said locking structure engaging said lock ring and said anti-siphon tube when said tube is positioned in said lock ring so as to inhibit rotation of said lock ring and said anti-siphon tube with respect to said installation tool and with respect to each other; and
   rotating said installation tool so as to secure said lock ring and said anti-siphon tube on said fuel filler neck.

11. The method of claim 10 wherein said inner cylindrical surface is sized to receive therein an exterior surface of said anti-siphon tube so as to position said anti-siphon tube off-axis with respect to said exterior surface of said lock ring.

12. The method of claim 10 wherein said anti-siphon tube is secured with said installation tool to a nozzle supporting projection positioned on an interior surface of said fuel filler neck.

13. An anti-siphon assembly, comprising:
   a lock ring including an exterior surface that defines an outside diameter and an inner circular surface axially offset from a central elongate axis of said exterior surface, said lock ring including an aperture communicating between said exterior surface and said inner circular surface;
   an anti-siphon tube including a projection receiving aperture therein, said anti-siphon tube positioned within said inner circular surface and having said projection receiving aperture aligned with said aperture of said lock ring; and
   a fuel filler neck including an interior surface having an inwardly extending projection positioned thereon, said lock ring and said anti-siphon tube positioned within said fuel filler neck such that said inwardly extending projection is positioned extending through said aperture of said lock ring and into said projection receiving aperture of said anti-siphon tube so as to secure said lock ring and said anti-siphon tube within said fuel filler neck.

14. The assembly of claim 13 wherein said anti-siphon tube includes first and second tool apertures positioned opposite said anti-siphon tube from said projection receiving aperture, said lock ring includes first and second tool apertures positioned opposite said lock ring from said aperture communicating between said exterior surface and said inner circular surface, and wherein said first tool apertures of said anti-siphon tube and said lock ring are aligned with one another when said second tool apertures of said anti-siphon tube and said lock ring are aligned with one another.

15. The assembly of claim 13 further comprising an installation tool including an inner shaft having first and second tool prongs extending outwardly there from, said first tool prong received within said first tool apertures of said anti-siphon tube and said lock ring when said installation tool is positioned within an interior of said anti-siphon tube, and said second tool prong received within said second tool apertures of said anti-siphon tube and said lock ring when said installation tool is positioned within said interior of said anti-siphon tube.

16. The assembly of claim 15 wherein said installation tool includes an outer sheath movable along said inner shaft between a first position wherein said sheath is positioned away from said first and second tool prongs, and a second position wherein said sheath is positioned adjacent said first and second tool prongs.

17. The assembly of claim 14 wherein said aperture of said lock ring is positioned opposite said lock ring from said first and second tool apertures of said lock ring.

18. The assembly of claim 14 wherein said projection receiving aperture of said anti-siphon tube is positioned opposite said anti-siphon tube from said first and second tool apertures of said anti-siphon tube.

19. The assembly of claim 13 wherein said anti-siphon tube includes a first end region secured within said lock ring, a second end region positioned distal from said first end region and including anti-siphon structure positioned therein, and a central region positioned there between, said central region of said anti-siphon tube including a bend therein.

* * * * *